United States Patent
Perkins

(10) Patent No.: US 6,795,485 B2
(45) Date of Patent: Sep. 21, 2004

(54) INTEGRATED QPSK/FSK DEMODULATOR

(75) Inventor: Michael Perkins, El Dorado Hills, CA (US)

(73) Assignee: Share Wave, Inc., Austin, TX (US)

( * ) Notice: Subject to any disclaimer, the term of this patent is extended or adjusted under 35 U.S.C. 154(b) by 189 days.

(21) Appl. No.: 09/729,814

(22) Filed: Dec. 4, 2000

(65) Prior Publication Data

US 2002/0067755 A1 Jun. 6, 2002

(51) Int. Cl.[7] ............................................ H04B 1/69
(52) U.S. Cl. .................................... 375/130; 375/334
(58) Field of Search .............................. 375/130, 303, 375/147, 316, 329, 222, 273, 269, 334, 272; 329/332, 300; 332/100; 370/329

(56) References Cited

U.S. PATENT DOCUMENTS

| | | | | |
|---|---|---|---|---|
| 4,691,342 A | * | 9/1987 | Waldron et al. | 375/223 |
| 4,916,455 A | * | 4/1990 | Bent et al. | 342/457 |
| 5,416,780 A | * | 5/1995 | Patel | 370/347 |
| 5,546,381 A | * | 8/1996 | Fukushima | 370/479 |
| 5,864,585 A | * | 1/1999 | Erisman | 329/311 |
| 5,974,092 A | * | 10/1999 | Roos et al. | 375/272 |
| 6,236,690 B1 | * | 5/2001 | Mimura et al. | 375/334 |

OTHER PUBLICATIONS

Yanpeng Guo, AN 1997 Phillips FM/IF Systems for GMSK/GFSK Receivers, Application Notes, Aug. 20, 1997, pp. 8.

* cited by examiner

*Primary Examiner*—Khai Tran
(74) *Attorney, Agent, or Firm*—James J. Murphy; Thompson & Knight LLP

(57) ABSTRACT

A spread spectrum radio receiver configurable for use in both a quadrature phase shift keying (QPSK) and a frequency shift keying (FSK) environment. The receiver may include a programmably selectable zero crossing detector unit for use when the receiver is configured for the FSK environment and/or programmable low pass filters having variable cut-off frequencies. A common local oscillator may be used regardless of whether the receiver is configured for use in the QPSK or FSK environment.

4 Claims, 3 Drawing Sheets

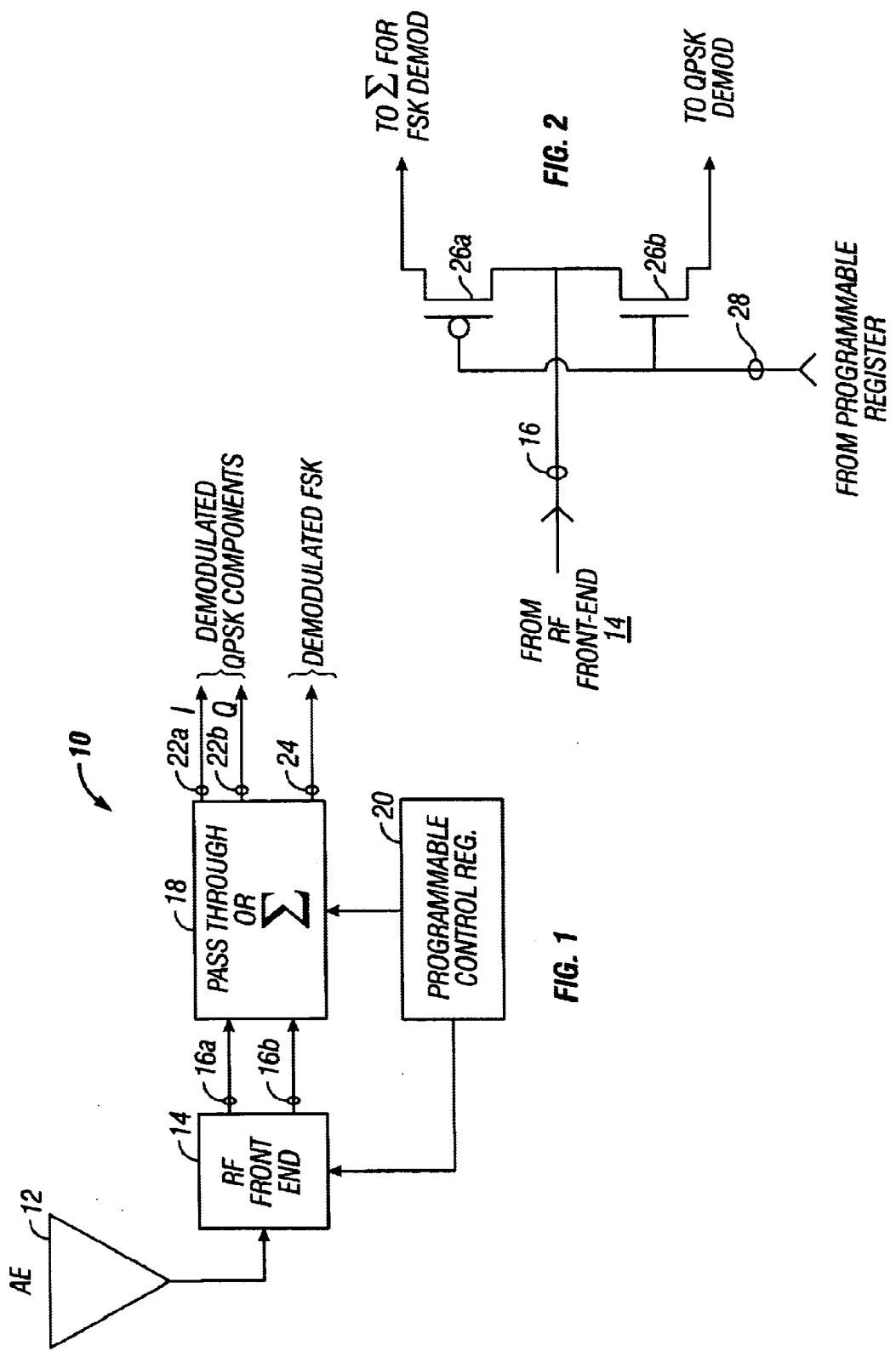

INTEGRATED QPSK/FSK DEMODULATOR

FIELD OF THE INVENTION

The present invention relates to the field of spread spectrum radio receivers and, in particular, to a demodulator capable of operating in QPSK or FSK environments.

BACKGROUND

Many different digital modulation techniques exist, however, at bottom any of these techniques may be grouped into one of three categories: amplitude shift keying (ASK), frequency shift keying (FSK) and phase shift keying (PSK). ASK describes a technique wherein a carrier wave, having a certain frequency "$f_c$", is multiplied by a digital information signal, g(t). Mathematically, the modulated carrier signal, s(t), is then:

$$s(t)=g(t)\sin(2\pi f_c t+\phi).$$

ASK is a special case of amplitude modulation (AM) and has the property of translating the spectrum of the modulation g(t) to the carrier frequency without altering the bandwidth thereof. This process is variously known as mixing, up-conversion or down-conversion.

FSK describes the modulation of a carrier signal by using a different frequency to represent a logic 1 or 0. The resultant modulated carrier, s(t), may be regarded as the sum of two amplitude modulated signals of different frequency:

$$s(t)=f_1(t)\sin(2\pi f_{c1}t+\phi)+f_2(t)\sin(2\pi f_{c2}t+\phi).$$

FSK is generally classified as wide-band or narrow-band depending upon whether or not the separation between the two carrier frequencies is larger or smaller, respectively, than the bandwidth of the spectrums of $f_1(t)$ and $f_2(t)$.

PSK describes a modulation technique wherein the phase of the carrier is altered to represent logic 1s and 0s. Mathematically:

$$s(t)=\sin(2\pi f_c t+\phi(t)).$$

PSK has several varieties, including binary PSK (BPSK), which has only two phases (0 and $\pi$), making BPSK a form of ASK with f(t) taking on values of −1 or 1; and quadrature PSK (QPSK), which has four phases (0, $\pi/2$, $\pi$ and $3\pi/2$). For a given bit rate, QPSK requires only half the bandwidth of PSK, making QPSK a popular modulation scheme.

The Institute of Electrical and Electronics Engineers (IEEE) is presently developing a standard to govern communications within Wireless Local Area Networks (WLANs) that relies on digital modulation techniques. That standard is referred to as IEEE 802.11 and it can be compared to the well-known IEEE 802.3 standard for communications within Ethernet wired LANs. The goal of the 802.11 standard is to provide a common operational model in order to resolve compatibility issues between different manufacturers of WLAN equipment. Accordingly, the IEEE 802.11 standards committee is preparing a version of a Media Access Control—Physical Level (MAC-PHY) level specification.

Under the IEEE 802.11 standard, the fundamental access method of the 802.11 MAC is known as Carrier Sense Multiple Access with collision avoidance, or CSMA/CA. Familiar to those accustomed to wired Ethernet LANs, CSMA/CA works on a "listen before talking scheme". Any station wishing to transmit data within the LAN must first sense the radio channel to determine whether another station is currently transmitting. Only if the radio channel is not busy may the intended transmission may proceed. If a current transmission is detected, he CSMA/CA scheme uses randomized time gaps (called back-off intervals) to wait before "listening" again to verify a clear channel. This process is repeated until the station is allowed to transmit. This type of multiple access scheme is meant to ensure judicious channel sharing while avoiding collisions.

The IEEE 802.11 PHY can be implemented in several ways, including diffused infrared (DFIR), direct sequence spread spectrum (DSSS) radio, and frequency hopped spread spectrum (FHSS) radio. Both of the spread spectrum radio techniques are used in the 2.4 GHz band because of wide availability in many countries and lower hardware costs in comparison to the higher microwave frequencies. The IEEE 802.11 standard supports DSSS for use with BPSK modulation at a 1 Mbps data rate, or QPSK modulation at a 2 Mbps data rate. The general band plan consists of five overlapping 26 MHz sub-bands centered at 2.412, 2.427, 2.442, 2.457, and 2.470 GHz. This scheme is used in an attempt to combat interference and selective fading. FHSS is supported with Gaussian FSK (GFSK) modulation and two hopping patterns with data rates of 1 Mbps and 2 Mbps. Under this scheme, the band is divided into 79 sub-bands of 1 MHz bandwidth each. Each sub-band is subject to a minimum rate of 2.5 hops/s using any of three possible hop patterns (22 hops in a given pattern). The minimum hop rate ensures that each packet sent could be transmitted in a single hop so that destroyed information could be recovered in another hop.

DSSS is a widely used form of spread spectrum and the DSSS process is performed by effectively multiplying an RF carrier and a pseudo-noise (PN) digital signal or code. First the PN code is modulated onto the information signal using one of several modulation techniques (e.g., BPSK, QPSK, etc). Then, a doubly balanced mixer is used to multiply the RF carrier and PN modulated information signal. This process causes the RF signal to be replaced with a very wide bandwidth signal with the spectral equivalent of a noise signal. The demodulation process (for the BPSK case) is then simply the mixing/multiplying of the same PN modulated carrier with the incoming RF signal. The output is a signal that is a maximum when the two signals exactly equal one another or are "correlated." The correlated signal is then filtered and sent to a BPSK demodulator. The signals generated with this technique appear as noise in the frequency domain. The wide bandwidth provided by the PN code allows the signal power to drop below the ambient noise threshold without loss of information.

One feature of DSSS is that QPSK may be used to increase the data rate. This increase of a factor of two bits per symbol of transmitted information over BPSK causes an equivalent reduction in the available process gain. The process gain is reduced because for a given chip rate, the bandwidth (which sets the process gain) is halved due to the two-fold increase in information transfer. The result is that systems in a spectrally quiet environment benefit from the possible increase in data transfer rate.

FHSS relies on frequency diversity to combat interference. This is accomplished by multiple frequency, code selected, FSK. Basically, the incoming digital stream is shifted in frequency by an amount determined by a code that spreads the signal power over a wide bandwidth. In comparison to binary FSK, which has only two possible frequencies, FHSS may have $2*10^{20}$ or more frequencies.

An FHSS transmitter is a pseudo-noise PN code controlled frequency synthesizer. The instantaneous frequency output of the transmitter jumps from one value to another based on the pseudo-random input from the code generator. Varying the instantaneous frequency results in an output spectrum that is effectively spread over the range of frequencies generated. In such a scheme, the number of available discrete frequencies determines the bandwidth of the system. Hence, the process gain is directly dependent upon the number of available frequency choices for a given information rate. Another important factor in FHSS systems is the rate at which the hops occur. The minimum time required to change frequencies is dependent on the information bit rate, the amount of redundancy used, and the distance to the nearest interference source.

SUMMARY OF THE INVENTION

In one embodiment, a spread spectrum radio receiver configurable for use in both a quadrature phase shift keying (QPSK) and a frequency shift keying (FSK) environment is provided. The receiver may include a programmably selectable zero crossing detector unit for use when the receiver is configured for the FSK environment and/or programmable low pass filters having variable cut-off frequencies. A common local oscillator may be used regardless of whether the receiver is configured for use in the QPSK or FSK environment.

In a further embodiment, a spread spectrum radio receiver having a programmable option for selecting QPSK or FSK operation is provided. The programmable option may include the use of a summing operation when FSK operation is selected.

BRIEF DESCRIPTION OF THE DRAWINGS

The present invention is illustrated by way of example, and not limitation, in the figures of the accompanying drawings in which like reference numerals refer to similar elements and in which:

FIG. 1 illustrates various components of a spread spectrum radio receiver in accordance with an embodiment of the present invention;

FIG. 2 illustrates one example of the manner in which a pass-trough or summing select operation may be performed in a spread spectrum radio receiver configured in accordance with an embodiment of the present invention;

DETAILED DESCRIPTION

Figure 3:
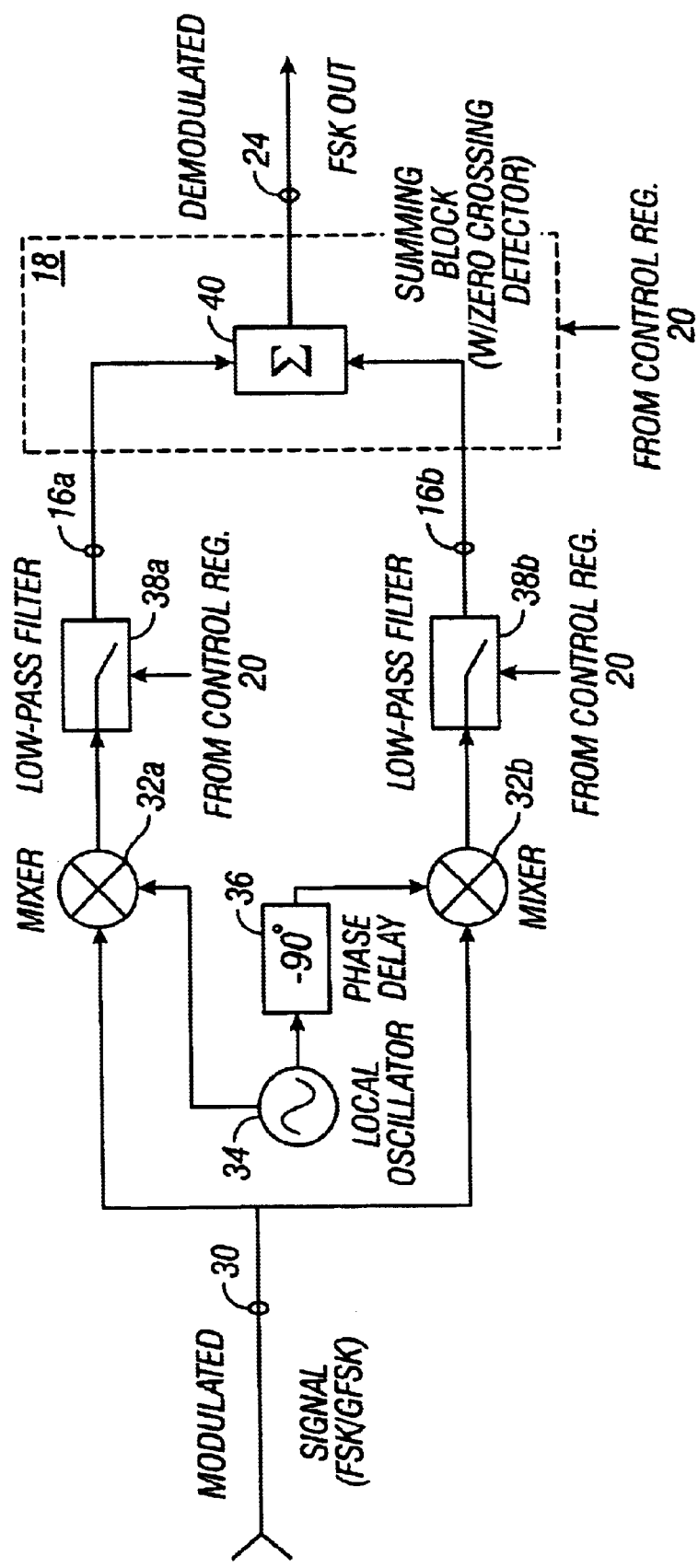
FIG. 3 further illustrates various components of the receiver shown in FIG. 1, when used for FSK demodulation.

An integrated QPSK/FSK demodulator is disclosed herein. Because the IEEE 802.11 standard allows for both DSSS (which uses QPSK modulation) and FSSS (which uses FSK modulation), such a demodulator is highly desirable as it allows for the use of a single receiver in either environment. Although discussed with reference to certain illustrated embodiments, upon review of this specification, those of ordinary skill in the art will recognize that the present invention may find application in a variety of systems. Therefore, in the following description the illustrated embodiments should be regarded as exemplary only and should not be deemed to be limiting in scope.

FIG. 1 illustrates the components of a spread spectrum radio receiver 10 that are of particular interest to the present discussion. Signals received at an antenna 12 are passed to a radio frequency (RF) front-end 14 where the signals may be amplified and down-converted prior to further processing. In general, the RF front-end of receiver 10 may be conventional in nature and will generally include a low noise amplifier, followed by a IF/mixer stage and a demodulator stage. Similar front-ends 14 for either QPSK or FSK reception may be used, although depending upon the frequency scheme certain variables such as the local oscillator frequency may be implementation dependent.

From the RF front-end 14, two output signals 16a and 16b are provided. These output signals generally represent magnitude and phase components of the information signal received at antenna 12, and will be further processed according to whether a QPSK or an FSK modulation scheme was employed during transmission. For the QPSK case, no further demodulation is necessary, as the magnitude and phase components represent the real (I) and quadrature (Q) components of the information signal. These I and Q components can be used to fully reconstruct the transmitted information signal. For the FSK case, however, these signal components must be summed and the resulting sum squared to provide a fully demodulated FSK signal.

Accordingly, receiver 10 is provided with a block 18 that operates under programmable control (e.g., as determined by the value loaded in a control register 20) to pass through the I and Q components in the case of QPSK demodulation or provide a summing/squaring operation (e.g., a zero crossing determination) for FSK demodulation. When the pass-through option is selected, the I and Q components 22a and 22b, respectively, of the received signal are not altered and may be passed to further conventional QPSK receiver components. Such additional components are not illustrated so as not to unnecessarily clutter the illustration. When the summing/squaring option is selected, the signal components are summed and a zero crossing determination is made so as to provide a fully decoded FSK signal 24. Other conventional components of an FSK receiver are not illustrated so as not to unnecessarily obscure the illustration.

One example of the manner in which a pass-through or summing select operation may be performed is illustrated in FIG. 2. As shown a signal 16 (which may be either signal 16a or 16b) from the RF front-end 14 may be provided to a pair of passgates 26a and 26b. The passgates are organized so that when one is active, the other is not. Various arrangements may be used to this function, and in this example passgate 26a is chosen to be a p-type MOS transistor and passgate 26b is chosen to be an n-type MOS transistor. The passgates are gated by a common control signal 28 from the programmable control register 20 so that regardless of the logic state of the control signal one or the other of the passgates will be active. If control signal 28 is a logic 1, passgate 26b is active and passgate 26a is not. On the other hand, if control signal 28 is a logic 0, passgate 26a is active and passgate 26b is not. When passgate 26a is active, signal 16 is provided to the summing option for FSK demodulation. When passgate 26b is active, signal 16 is provided to the pass-through option, indicating QPSK demodulation is being used.

FIG. 3 further illustrates various components of the receiver 10, when used for FSK demodulation. In this example, a modulated FSK (or GFSK, etc.) signal 30 is provided to the inputs of two mixers 32a and 32b. Each of the mixers 32a and 32b provides a down conversion function and so each mixer is provided with a local oscillator input as well. Mixer 32a receives a signal from local oscillator 34 directly, while mixer 32b receives a signal from local oscillator 34 that is 90° out-of-phase with respect to the signal provided to mixer 32a. This phase difference may be provided through the use of a phase delay block 36 as is common in the art. The use of these signals with varying phase allows for magnitude and quadrature components of input signal 30 to be extracted during the down-conversion process.

The outputs of the mixers 32a and 32b are low pass filtered using low pass filters 38a and 38b. Each of these filters may be a programmable low pass filter that has a cut-off frequency that can be determined according to a control value stored in control register 20 or another control register. For example, the control register 20 may store a value used to control a digital-to-analog converter that is used to set the resolution of the low pass filters 38a and 38b. Alternatively, the low pass filters 38a and 38b may be GAC filters based on Gilbert cells. Such filters have a cut-off frequency that depends upon the magnitude of the current being injected into a node of the Gilbert cell and this current can be controlled by varying a resistance presented thereto. Thus, the value stored in the control register 20 may be used to set this resistance.

From the low pass filters, the baseband output signal components 16a and 16b are provided to the block 18, which in this case has been programmed to provide a summing operation 40. This summing operation is preferably combined with a zero crossing detector to provide the demodulated FSK output signal 24 as discussed above.

Figure 4:
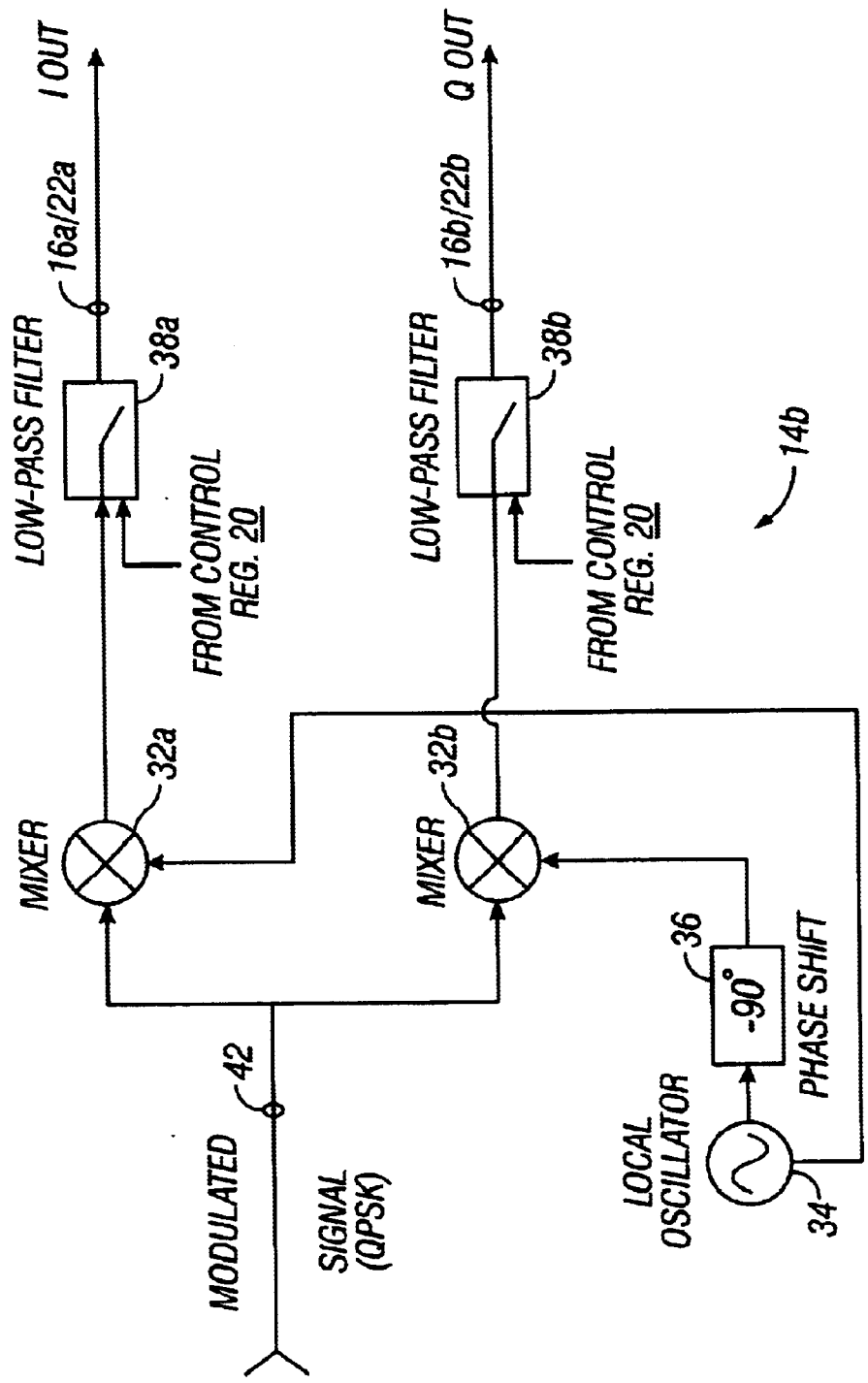
FIG. 4 illustrates the various components of the receiver shown in FIG. 1, when used for QPSK demodulation.

FIG. 4 illustrates the various components of the receiver 10, when used for QPSK demodulation. As can be observed from the illustration, one of the real advantages offered by the present receiver architecture is that all of the components of the RF front-end can be shared between the FSK demodulation scheme and the QPSK demodulation scheme. In this example, a modulated QPSK signal 42 is provided to the inputs of mixers 32a and 32b. As before, each of the mixers 32a and 32b provides a down conversion function and so each mixer is provided with a local oscillator input as well. Mixer 32a receives a signal from local oscillator 34 directly, while mixer 32b receives a signal from local oscillator 34 that is 90° out-of-phase with respect to the signal provided to mixer 32a. This phase difference may be provided through the use of a phase delay block 36 as is common in the art. The use of these signals with varying phase allows for magnitude and quadrature components of input signal 42 to be extracted during the down-conversion process. For one embodiment, the local oscillator 34 may be configured to provide an output signal at 280 MHz.

The outputs of the mixers 32a and 32b are low pass filtered using low pass filters 38a and 38b as discussed above. Again, each of these filters may be a programmable low pass filter that has a cut-off frequency that can be determined according to a control value stored in control register 20 or another control register as indicated above. When used for QPSK demodulation, the low pass filters 38a and 38b may be programmed to have a band pass of 17 MHz, while in the FSK case the filters may be programmed to have a bandpass of only 1 MHz.

From the low pass filters, the baseband output signal components 16a and 16b are provided to as the demodulated QPSK output signals 22a and 22b as discussed above. The pass-through operation is not illustrated in detail as it has been described above.

Thus an integrated QPSK/FSK demodulator has been described. Although the foregoing description and accompanying figures discuss and illustrate specific embodiments, it should be appreciated that the present invention is to be measured only in terms of the claims that follow.

What is claimed is:

1. A spread spectrum radio receiver configurable for use in both a quadrature phase shift keying (QPSK) and a frequency shift keying (FSK) environment, the radio receiver comprising:
   a radio frequency (RF) front end having:
      a common local oscillator; and
      mixing circuitry for combining an oscillator signal with a received radio frequency signal to provide first and second signals having a quadrature relationship to each other; and
   a circuit for selectively combining the first and second signals responsive to whether the spread spectrum radio receiver is configured for use in the QPSK or FSK environment.

2. The spread spectrum radio receiver of claim 1 comprising a programmably selectable zero crossing detector unit for use when the receiver is configured for the FSK environment.

3. The spread spectrum radio receiver of claim 2 further comprising programmable low pass filters having variable cut-off frequencies.

4. A spread spectrum radio receiver configurable for use in both a quadrature phase shift keying (QPSK) and a frequency shift keying (FSK) environment, comprising a programmably selectable zero crossing detector unit for use when the receiver is configured for the FSK environment and programmable low pass filters having variable cut-off frequencies, the low pass filters selectively shared between the QPSK and FSK environments.

* * * * *